United States Patent Office 3,243,822
Patented Apr. 5, 1966

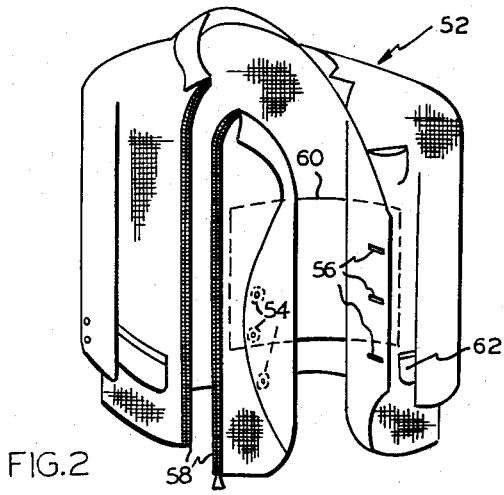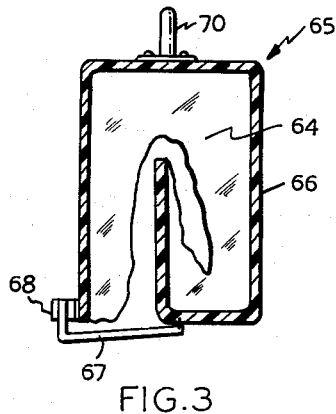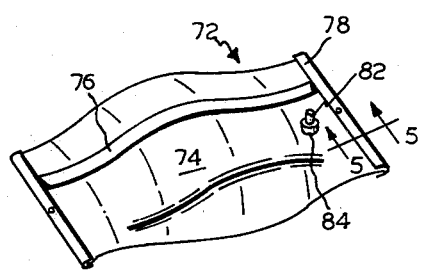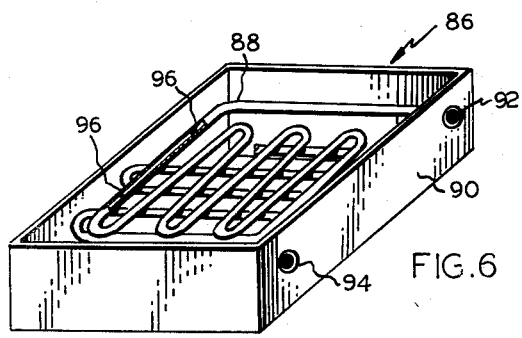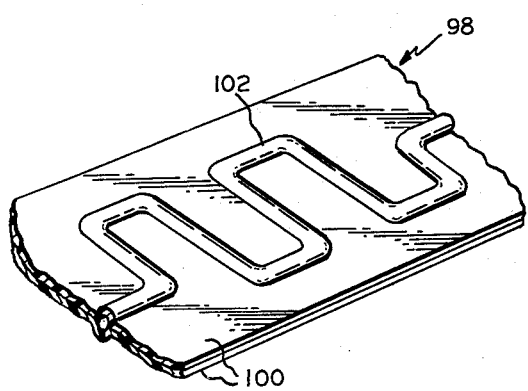

3,243,822
PERSONAL INFLATABLE SAFETY DEVICE
Martin Lipkin, 445 E. 86th St., New York, N.Y.
Filed Mar. 23, 1964, Ser. No. 354,067
7 Claims. (Cl. 2—2)

This invention relates to a personal safety device for protecting a person against the effects of violent deceleration; more particularly to an inflatable pneumatic device to be worn by an occupant of an airplane or automobile and adapted to be inflated during or before a collision for the purpose of preventing or minimizing injury to said person during the crash or rapid deceleration.

Many of the injuries incurred today in motor vehicle collisions and airplane crashes could be avoided if the occupants of the vehicle could be held in place and/or cushioned. Particularly, in automobiles, the injuries incurred are often the result of the passenger either being thrown from the car into a stationary object or, alternatively, being slammed into the steering wheel, the dashboard, the windshield, or other solid objects in the car. In airplane crashes the number of fatalities can be minimized if the passanger can be held securely in his seat and prevented from striking any hard objects with his body.

Seat belts are a partial solution to the problem. They hold a passenger in the seat of the vehicle and restrain him from being thrown out of his seat. However, they cannot prevent flailing arms, legs and head from striking adjacent fixed objects of the type likely to do damage to the human body, or prevent flying objects from striking the strapped-in iindividual, nor can they remain effective in any way if their moorings come loose, as can happen in airplanes, thus permitting unrrestrained motion of the strapped-in individual. Seat belts, in instances of severe deceleration can inflict internal injuries to the body of the person enclosed. The belt can crack ribs, rupture blood vessels and/or crush vital organs.

As is well known from crash studies that have been carried out by various agencies, the human form can withstand extremely high rates of deceleration for relatively short intervals. In fact, in tests, persons have been known to have safely experienced decelerating forces approaching or even exceeding 100 times the normal acceleration of gravity, provided that the forces are applied to the body more or less uniformly over its surface and with a smooth transitional curve of force with respect to time. One means, whereby restraining or decelerating forces can be applied nearly uniformly over substantially all the body area, facing in the direction of deceleration, is to have a person's body impinge upon a balloon or other suitable pneumatic device of sufficient size. As a person's body tends to compress the pneumatic device, the pressure of the entrapped gas within said device will increase proportionately and will distribute the force uniformly over the entire portion of the person's body surface that is in contact with the safety device. Quite low initial pressure, not exceeding several atmospheres may be supplied to the pneumatic device without impairing its effectiveness. For example, if the contact area between a 200 pound human and a large balloon were about four square feet, a decelerating force of 125 gravities would cause the pressure in the balloon to rise to about three atmospheres. The pressure on the contact surface would then be about 44 lbs. per square inch of surface area. Such pressures can be easily borne by balloon materials now in use, without bursting. A balloon or other suitable pneumatic device thus can serve as the principal cushioning agency for a human body by holding it in position with a nearly uniform force over the body area and preventing the person from striking material objects which may be in his path. If a balloon be placed between a decelerating person and hard objects, the balloon will conform to the shapes of the objects and yet provide a smooth face to the human body.

Protective pneumatic devices, attached to the vehicle body adjacent the occupants, have been suggested in the past. These devices, though, have several inherent weaknesses. Firstly, there is the possibility of the person to be shielded being thrown clear of the seat and becoming separated from the balloon attached to the vehicle. Secondly, when safety devices, belts or balloons, are installed in the vehicle the rider or passenger is always at the mercy of the owner. While it is probable that the owner of a car will install protective devices for front seat passengers, it is usually the case that rear seat occupants are left unprotected unless they can provide their own protection. Furthermore, the rider, in the front or back, must depend on the vehicle owner to check his safety devices at regular intervals to prevent a malfunction at a critical time. The rider, on the other hand, may not be familiar with the arrangement used to actuate a safety device, such as the particular pneumatic cushion used by a vehicle owner, and may neglect to check it out before starting a trip. When an acicdent occurs there is usually not enough time for considering the workings of the device.

Other types of personal protective apparel exist which utilize inflatable sections surrounding the body of the individual being protected and attached to him rather than to the vehicle. Some, like the "G" suit worn by jet pilots and astronauts, are not suitable for cushioning the wearer against impacts, but are rather designed to control the flow of body fluids and prevent loss of consciousness during periods of acceleration or deceleration.

The existing pneumatic devices have several serious disadvantages. The idea behind the prior art devices is that of encasing the human form within an encircling balloon or pneumatic structure. The main fault, inherent in a balloon that surrounds a person to be protected, is that it allows the subject too much motion within the balloon, permitting the gas to shift around the balloon when displaced by the moving body, and therefore being at best only slightly effective in cushioning the wearer against impacts. Another objection to this type of structure is that it can create difficulties in extracting an injured person from the device when so encased. Also when a protective cushion surrounds the body, the protective cushioning value obtained for a given practical thickness of balloon, as measured away from the body, is halved.

When considering safety devices, the personal angle must not be overlooked. Devices that must be attached to the person after entering a vehicle are likely to be disregarded. Furthermore, persons will hesitate to don a cumbersome structure that will restrict their movements or be nucomfortable to wear. A sophisticated traveler, dressed in a suit will resent wearing a bulky, conspicuous contraption.

Therefore, it is an object of the present invention to provide a readily inflatable pneumatic device, which in its very compact uninflated state, can be attached to the person, or worn by the person or be convveniently carried by the person who derives the potential protection against injury from the pneumatic device.

Another object of the present invention is to provide a protective pneumatic device, which in its fully inflated state, is secured to the body of the person to be protected by means of a system of straps or a harness, or by being incorporated into the closing which the person to be protected wears.

A further object of the present invention is to provide a protective pneumatic device which is secured to the front of an individual and which is of a sufficient size, when inflated, to effectively cushion the person against injury caused by contact with other objects during the course of a crash.

A still further object of the present invention is to provide a pneumatic personal safety device having an over-pressure relief valve that will allow gas to escape from the device when a sufficiently high pressure is attained to dissipate the energy of impact and minimize rebound after the principal impact has occurred.

Another object of the present invention is to provide a protective device having several separate regions or areas for containing inflating gas and interconnecting means between the regions such that a rupture in the outer wall of one region will not allow gas to escape from them all, although allowing all of the regions to be inflatable from a single source.

Another object of the present invention is to provide a pneumatic safety device including a means for rapid deflation when necessary.

Another object of the present invention is to provide a pneumatic safety device of sufficient size to cushion the human body and consisting of a long thin inflatable tube coiled up within a vented casing.

Other objects and advantages of the present invention will be apparent from the accompanying drawings and description.

In the drawings:

FIGURE 2 is a vertical pictorial view of a simulated suit jacket, to be worn when travelling, for concealing a deflated pneumatic safety device fitted within a false front thereof;

FIGURE 3 is a vertical cross-sectional view of another species of the present invention in which the pneumatic device is incorporated in a simulated suitcase;

FIGURE 4 is a perspective view of another species of the present invention in which the pneumatic device is a large heat sealed plastic bag;

FIGURE 5 is a cross-sectional view of FIGURE 4 through line 5—5 illustrating the structure of the heat sealed ends;

FIGURE 6 is a perspective view of another species of the present invention in which a coiled tubular balloon structure is included within a vented bag having one side removed for visibility;

FIGURE 7 is a vertical longitudinal view of another species of the present invention in which an inflatable channel is formed between two sheets of heat-sealed plastic.

Figure 1:
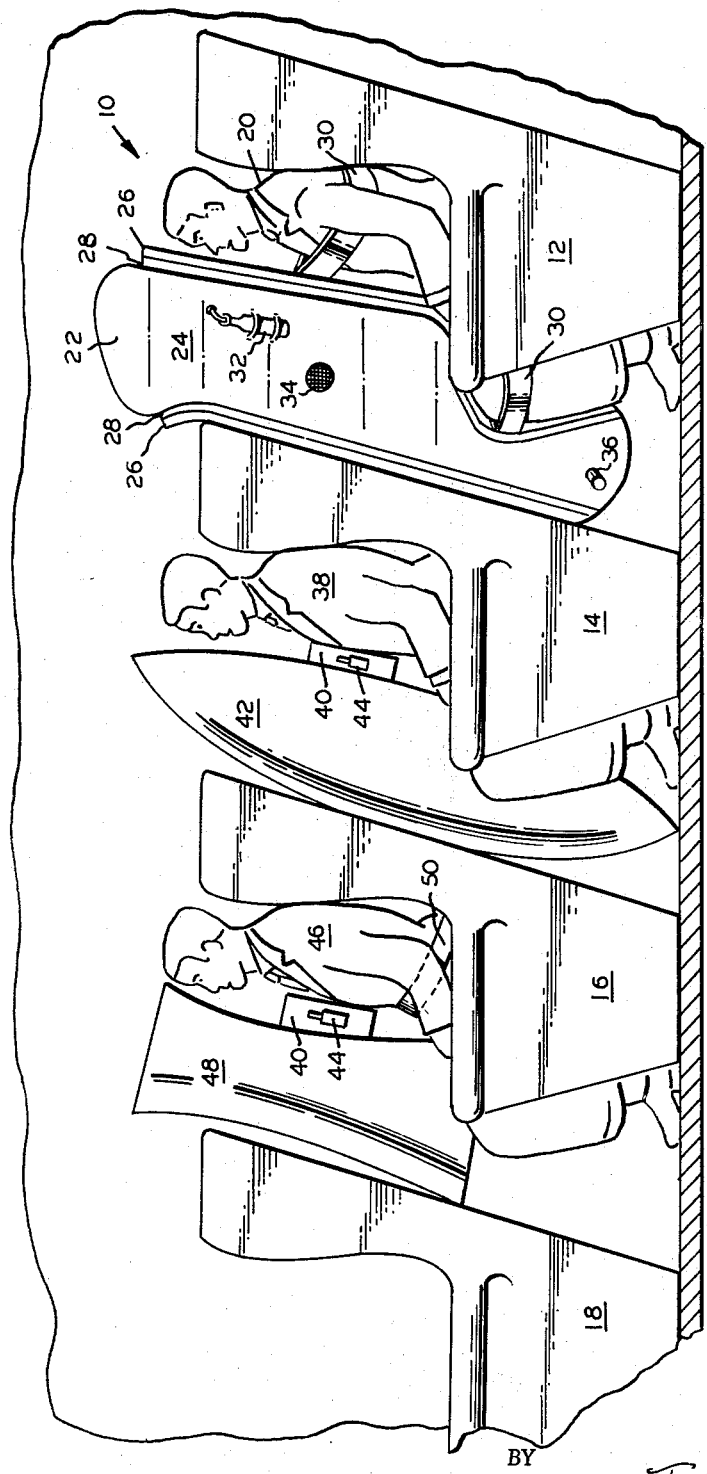
FIGURE 1 is a longitudinal, vertical, sectional view through a portion of the lounge of a commercial airliner with passengers therein and showing a plurality of species of the pneumatic safety device, all in the inflated condition.

A number of embodiments of the present invention, are illustrated in FIGURE 1, which shows the interior of an aircraft lounge, generally designated 10 having a number of stationarily mounted passenger seats 12, 14, 16 and 18. A passenger 20 in seat 12 is held protectively in place by an inflatable balloon device, generally designated 22, contained between the passenger 20 and the back of the next forward seat 14. The balloon device 22 consists of a central expandable plastic or rubber bag 24 having layers of padding 26 fixed to portions of the bag 24 by adhesive layers 28 adjacent the passenger 20 and the back of the seat 14. The balloon device 22 is secured to the passenger 20 by means of two straps 30, one below the armpits and one behind the knees of the wearer 20. If more straps are desired, a waist strap could be used, or even a harness such as with parachutes. These straps may have the usual length-adjusting buckles, and hook attachments (not shown). An inflating device, such as a compressed air cylinder 32, and a deflating device 34 such as a common on-off valve, are both mounted on the surface of the bag 24 in a position in which they are easily accessible to the wearer 20. An over-pressure relief valve 36, of the type well known in the art, can be mounted through the bag 24 for impact energy dissipation and rebound prevention.

A passenger 38, shown sitting in seat 14, has a front, parachute-type, pack 40 mounted on his chest. The pack 40 encloses a folded up balloon 42 which can be inflated by means of a compressed air device 44 mounted on the side of the pack 40. Expanded balloon 42 illustrates the use of a large balloon that covers the entire area in front of its user between the passenger 38 and the back of the next forward seat 16.

A passenger 46, shown sitting in a seat 16, also has a front parachute-type pack 40 on his chest enclosing a folded up balloon 48. The expanded balloon shown, contained between the passenger 46 and the back of the next forward seat 18, illustrates the use of a somewhat smaller balloon that covers only the area from the hips upwards. While the larger balloon 42 is preferred, the smaller balloon 48 may be useful for persons who travel only in vehicles where dependable seat belts 50 and anchorages therefor (not shown) are present. In both instances, the inflated balloon should be at least as wide as the torso of its user, but should preferably be as wide as his shoulders or even somewhat wider. The inflated balloon should also extend at least as high as the top of the user's head while the thickness of the inflated balloon should be as great as is consistent with the space likely to exist in front of the user in the seating arrangement, and should be at least one foot thick.

FIGURE 2 shows an article of apparel, generally designated 52, that to all external appearances is simply a man's business suit jacket with a conventional front flap opening secured by buttons 54 and button holes 56. The wearer does not, however, don and remove the jacket 52 via these buttons 54 and the conventional flap opening, but instead via a concealed or disguised closure such as a zipper 58. The front flap opening, secured by the buttons 54, becomes, instead, a false front opening that provides access to a compartment in which a pneumatic balloon 60 is stored in an uninflated and folded state. The lines defining the balloon in its stored position also define the location of a piece of fabric that is bridged across the interior of the flap opening to act as a member for the attachment and support of the balloon 60. An inflating hose (not shown) originating at the balloon 60 communicates with a compressed air cylinder (not shown) located within the pocket 62 of the jacket 52. By simply reaching a hand into the pocket 62 the wearer can open the compressed air cylinder so that the balloon may be inflated.

FIGURE 3 shows, in cross-section, an arrangement in which the uninflated balloon 64 is folded up to resemble a small attache case, generally designated 65, with a firm layer 66 of imitation leather or other material exposed on the outside thereof. A strap 67 sewn to one end of the outside layer 66 extends across to the other end and is connected thereto by a snap coupling 68 to hold the balloon in its folded shape. A carrying handle 70 may also be fixed to the outer layer 66. Alternatively, the balloon 64 may be fitted into a separate carrying case (not shown) rather than forming its own by folding.

In FIGURE 4 is shown a plastic bag type of pneumatic device of tubular construction, generally designated 72. Starting with a flat sheet of thermoplastic material 74, the sides are folded over and heat sealed at 76 while the ends are joined and sealed with a pair of strengthening flaps 78 (FIGURE 5). To prevent the inner faces of the balloon fabric from adhering to each other when the flaps 78 are sealed across the ends of the plastic sheet 74, they may be separated by inserting between them flat strips of inert material 80 that will not adhere to the balloon fabric during the sealing operation. An inlet valve 82 that may be of the molded type is sealed to the balloon wall by a base flange 84.

FIGURE 6 discloses an inflatable pneumatic device, generally designated 86, which comprises an inflatable tubular hose 88 coiled within a closed perforated bag 90 (perforations not shown) (hose 88 has been shown only in part for drawing clarity). The perforated bag 90 has a pair of apertures 92 and 94 connected on the inside of the bag 90 to the ends of the hose 88 and which on the outside are attached, respectively, to inflating and deflating valve means (not shown); actuation of the inflating valve means causing expansion of the tubular inflatable hose 88 thereby substantially filling the bag 90, the air in said bag being forced out through the perforations. The broken away section of the hose 88 illustrates a method of minimizing leakage due to ruptures by incorporating one way valves 96, of known structure in the hose 88, spaced evenly along its length. A rupture at any location along the hose can only release the gas, and drop the gas pressure, from the regions of hose 88 above the rupture, and not from those regions lying below said rupture.

FIGURE 7 illustrates a method for fabricating a tubular hose, generally designated 98 by heat sealing two sheets 100 of plastic with a seal resist material included between the sheets 100 in the pattern of the tube 102 desired. This general process is used to fabricate metal heat exchangers by welding.

As discussed above, the general idea of using an inflated balloon to protect the human body against extreme deceleration forces is not new. The concepts herein disclosed, however, permit the practical application of this general idea for the protection of passengers in both aircraft and automobiles. The present invention avoids all of the disadvantages of the prior art devices by providing a cushioning balloon attached to the person, rather than the vehicle and which, when inflated, is located entirely in front of the person to be protected to provide the maximum restraint to forward motion of the person and allow his easy separation from this safety device.

Since each device is designed as a personal piece of equipment or clothing, the wearer and owner will be familiar with the operation of his and therefore will be able to quickly actuate and inflate the device in an emergency. Being personal property, the routine checking and repair of these pneumatic safety devices becomes the responsibility of the person most interested, the wearer. Furthermore, the person is given freedom to select a device of superior construction and workmanship and of the proper size for his particular body proportions. The possession of the device will render it of greater usefulness to the individual traveler because of its constant availability to him, which renders his safety not contingent upon the presence of such a safety device in the vehicle. Finally, the attachment of the cushioning ballon to the passenger has the advantage that the balloon will stay with the passenger during a collision, so that its effectiveness will not be lost due to the collapse or dismemberment of the vehicle.

The design of the balloon with accessible inflating and deflating means as well as over-pressure relief valves permits the wearer to: quickly inflate the device in case of a collision; quickly deflate the balloon so as to be easily extracted from a wrecked vehicle; and avoid excessive energy storage due to high pressure which might cause rebound or burst the balloon.

In addition to the foregoing reasons for the greater effectiveness and usefulness of the present invention is the design of the safety device as an article of personal clothing, available to be worn whenever and wherever desired and subject to variations in style and design to nearly the same extent as are any similar men's or women's clothing. This piece of clothing can, in all respects, be a full-fledged member of the personal wardrobe of a sophisticated and safety-conscious traveler. The individual may wear this safety device, in public, inconspicuously and yet be fully equipped with the cushioning apparatus, useable in any emergency situation. The location of the balloon when stored is in front of the torso, and may be at the chest, midriff, or abdomen concealed within a suit jacket, a vest or sweater, or a topcoat.

It is understood that even though there are herein shown and described preferred embodiments of the invention, various changes may be made without departing from the spirit and full intent of the invention.

What I claim is:

1. An impact cushioning personal safety device for a person travelling at speeds in a vehicle, said device consisting of: an inflatable means, means for inflating said inflatable means in anticipation of a violent deceleration, means for securely attaching the inflatable means to a person so that the inflatable means extends across the front portion of the person only, and over-pressure valve means, associated with said inflatable means, for releasing excessive pressure within the inflatable means and preventing rebound of the person attached thereto.

2. An impact cushioning personal safety device for a person travelling at speeds in a vehicle, said device consisting of: an inflatable means, means for inflating said inflatable means in anticipation of a violent deceleration, means for securely attaching the inflatable means to a person so that the inflatable means extends across the front portion of the person only, said means for attaching the inflatable means to the body of said person including an openable container means attached to the front of said person, said container means being secured to said inflatable means, said container means enclosing said inflatable means in the deflated condition, said inflatable means being substantially outside of said container means when inflated, said container means consisting of simulated wearing apparel extending over at least a portion of the torso of said person and having a concealed means for mounting said inflatable means in the front thereof, said inflatable means being concealed within said opening when deflated, said wearing apparel consisting of a jacket having a first opening means comprising front flaps, releaseable means for joining said front flaps, connecting means extending between said flaps in said jacket, and means for mounting said inflatable means on said connecting means within said flaps so that the inflatable means is concealed when the front flaps of said jacket are adjoined.

3. An impact cushioning personal safety device as recited in claim 2 wherein there is a concealed second opening means extending across said jacket unobstructed by connecting means for removal of said jacket from said person.

4. An impact cushioning personal safety device for a person travelling at speed in a vehicle, said device consisting of: an inflatable means, means for inflating said inflatable means in anticipation of a violent deceleration, means for securely attaching the inflatable means to a person so that the inflatable means extends across the front portion of the person only, said inflatable means consisting of a long hollow flexible tube closeable at the ends thereof, said tube being contained within a vented flexible closed container, and a series of one way valve means distributed along the interior of said tube forming a line of adjacent compartments whereby a rupture in the tube forming the outer wall of the compartment will not usually release all of the gas in the tube when the tube is in the inflated condition.

5. An impact cushioning personal safety device for a person travelling at speed in a vehicle, said device consisting of: a portable inflatable means, means for inflating said inflatable means in anticipation of a violent deceleration, means for securely attaching the inflatable means to a person so that the inflatable means extends across the front portion of the person only, said last named means comprising strap means connected to said inflatable means, said strap means extending around a person in a direction away from the inflatable means, said strap means being the sole support means for said inflatable means, and said inflatable means when in inflated condition substantially protecting the entire frontal portion of the person using said personal safety device.

6. An impact cushioning personal safety device for a person travelling at speed in a vehicle, said device consisting of: a portable inflatable means, means for inflating said inflatable means in anticipation of a violent deceleration, means for securely attaching the inflatable means to a person so that the inflatable means extends across the front portion of the person only, said last named means including an openable container means attached to the front of said person, said container means enclosing said inflatable means when said inflatable means is in a deflated condition, said inflatable means extending out of said container means when inflated, said container means consisting of simulated wearing apparel extending over at least a portion of the torso of said person and having a concealed means for mounting said inflatable means in the front thereof, said inflatable means being concealed within said concealed means when deflated but extending out of said concealed means when inflated.

7. An impact cushioning personal safety device for a person travelling at speed in a vehicle, said device consisting of: a portable inflatable means, means for inflating said inflatable means in anticipation of a violent deceleration, means for securely attaching the inflatable means to a person so that the inflatable means extends across the front portion of the person only, said last named means being the sole support means for said inflatable means whereby said inflatable means may be used in any type of vehicle without special vehicle structure, said inflatable means consisting of a flexible hollow member having a relatively hard, substantially rectangular, layer attached to one side thereof, a carrying handle fixed to the outer surface of said hard layer, means for connecting the opposite ends of said hard layer temporarily, whereby said inflatable member may be folded up to resemble a suitcase and carried by said person.

References Cited by the Examiner

UNITED STATES PATENTS

| | | | |
|---|---|---|---|
| 1,042,327 | 10/1912 | Costanzo | 2—2 |
| 1,256,594 | 2/1918 | Rodal | 2—2 |
| 1,587,946 | 6/1926 | Gibson | 2—2 |
| 2,313,151 | 3/1943 | Johnson | 2—2 X |
| 2,338,535 | 1/1944 | Pfleumer | 2—2 |
| 2,806,737 | 9/1957 | Maxwell | 280—50 |
| 2,834,606 | 5/1958 | Bertrand | 280—150 |
| 2,834,609 | 5/1958 | Bertrand | 280—150 |
| 3,146,460 | 9/1964 | Henderson | 2—2 |

BENJAMIN HERSH, *Primary Examiner.*

LEO FRIAGLIA, *Examiner.*